(12) United States Patent
Shveidel et al.

(10) Patent No.: US 11,256,439 B2
(45) Date of Patent: Feb. 22, 2022

(54) SYSTEM AND METHOD FOR PARALLEL JOURNALING IN A STORAGE CLUSTER

(71) Applicant: EMC IP Holding Company, LLC, Hopkinton, MA (US)

(72) Inventors: Vladimir Shveidel, Pardes-Hana (IL); Anton Kucherov, Dudley, MA (US); Amitai Alkalay, Kadima (IL); Ronen Gazit, Tel Aviv (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 16/916,330

(22) Filed: Jun. 30, 2020

(65) Prior Publication Data
US 2021/0405880 A1 Dec. 30, 2021

(51) Int. Cl.
*G06F 3/06* (2006.01)
*G06F 11/07* (2006.01)

(52) U.S. Cl.
CPC .............. *G06F 3/065* (2013.01); *G06F 3/067* (2013.01); *G06F 3/0619* (2013.01); *G06F 11/0727* (2013.01); *G06F 11/0751* (2013.01)

(58) Field of Classification Search
CPC .. G06F 11/0727; G06F 11/0751; G06F 3/065; G06F 3/0619; G06F 3/067
See application file for complete search history.

(56) References Cited

U.S. PATENT DOCUMENTS

| | | | |
|---|---|---|---|
| 9,122,589 B1* | 9/2015 | Bono | G06F 12/0868 |
| 9,916,244 B1* | 3/2018 | Tolvanen | G06F 3/0659 |
| 2013/0013564 A1* | 1/2013 | Ben-Or | G06F 11/1662 707/640 |
| 2015/0082000 A1* | 3/2015 | Hong | G06F 12/1009 711/205 |
| 2021/0117085 A1* | 4/2021 | Vankamamidi | G06F 3/0679 |

* cited by examiner

*Primary Examiner* — Jigar P Patel
(74) *Attorney, Agent, or Firm* — Brian J. Colandreo; Mark H. Whittenberger; Holland & Knight LLP

(57) ABSTRACT

A method, computer program product, and computing system for receiving, via a first node of a plurality of nodes, data for storage in a storage system. The data may be written, via the first node, to one or more data pages of a log buffer of the first node. One or more page descriptors associated with the one or more data pages may be generated via the first node. The one or more page descriptors may be sent to a second node concurrently with the writing of the data to the one or more data pages of the log buffer of the first node.

17 Claims, 10 Drawing Sheets

SYSTEM AND METHOD FOR PARALLEL JOURNALING IN A STORAGE CLUSTER

BACKGROUND

Storing and safeguarding electronic content may be beneficial in modern business and elsewhere. Accordingly, various methodologies may be employed to protect and distribute such electronic content.

Multiple storage nodes of a storage cluster may be configured in an active/active configuration where processing of data by one storage node may be synchronized to the other storage node(s). However, conventional approaches to journaling data in a storage cluster require serialized actions. IO latency of these approaches is sum of time intervals that each separate action takes. Moreover, each step of these conventional approaches may involve waiting for available CPU cores and/or rescheduling of these actions. Accordingly, embodiments of the present disclosure may reduce IO latency with parallel journaling in the storage cluster.

SUMMARY OF DISCLOSURE

In one example implementation, a computer-implemented method executed on a computing device may include, but is not limited to, receiving, via a first node of a plurality of nodes, data for storage in a storage system. The data may be written, via the first node, to one or more data pages of a log buffer of the first node. One or more page descriptors associated with the one or more data pages may be generated via the first node. The one or more page descriptors may be sent to a second node concurrently with the writing of the data to the one or more data pages of the log buffer of the first node.

One or more of the following example features may be included. The one or more page descriptors may be written, via the second node, to a page descriptor buffer of the second node. In response to writing the one or more page descriptors to the page descriptor buffer of the second node, an acknowledgement signal may be sent to the first node indicating that the one or more page descriptors are written to the page descriptor buffer of the second node. An acknowledgement signal may be sent to a computing device that sent the data to the storage system in response to determining that the data is written to the one or more data pages of the log buffer of the first node, and receiving the acknowledgement signal from the second node indicating that the one or more page descriptors are written to the page descriptor buffer. A last confirmed page descriptor associated with a last data page of the one or more data pages written to the log buffer of the first node may be defined. The last confirmed page descriptor associated with the last data page written to the log buffer of the first node may be sent to the second node. It may be determined that the first node has failed. It may be determined, via the second node, the last confirmed page descriptor associated with the last data page written to the log buffer of the first node. One or more subsequent page descriptors may be verified, on the first node, based upon, at least in part, the last confirmed page descriptor associated with the last data page written to the log buffer of the first node. One or more ranges of confirmed page descriptors associated with a plurality of data pages written to the log buffer of the first node may be defined. The one or more ranges of confirmed page descriptors associated with a plurality of data pages written to the log buffer of the first node may be sent to the second node.

In another example implementation, a computer program product resides on a computer readable medium that has a plurality of instructions stored on it. When executed by a processor, the instructions cause the processor to perform operations that may include, but are not limited to, receiving, via a first node of a plurality of nodes, data for storage in a storage system. The data may be written, via the first node, to one or more data pages of a log buffer of the first node. One or more page descriptors associated with the one or more data pages may be generated via the first node. The one or more page descriptors may be sent to a second node concurrently with the writing of the data to the one or more data pages of the log buffer of the first node.

One or more of the following example features may be included. The one or more page descriptors may be written, via the second node, to a page descriptor buffer of the second node. In response to writing the one or more page descriptors to the page descriptor buffer of the second node, an acknowledgement signal may be sent to the first node indicating that the one or more page descriptors are written to the page descriptor buffer of the second node. An acknowledgement signal may be sent to a computing device that sent the data to the storage system in response to determining that the data is written to the one or more data pages of the log buffer of the first node, and receiving the acknowledgement signal from the second node indicating that the one or more page descriptors are written to the page descriptor buffer. A last confirmed page descriptor associated with a last data page of the one or more data pages written to the log buffer of the first node may be defined. The last confirmed page descriptor associated with the last data page written to the log buffer of the first node may be sent to the second node. It may be determined that the first node has failed. It may be determined, via the second node, the last confirmed page descriptor associated with the last data page written to the log buffer of the first node. One or more subsequent page descriptors may be verified, on the first node, based upon, at least in part, the last confirmed page descriptor associated with the last data page written to the log buffer of the first node. One or more ranges of confirmed page descriptors associated with a plurality of data pages written to the log buffer of the first node may be defined. The one or more ranges of confirmed page descriptors associated with a plurality of data pages written to the log buffer of the first node may be sent to the second node.

In another example implementation, a computing system includes at least one processor and at least one memory architecture coupled with the at least one processor, wherein the at least one processor may be configured to receive, via a first node of a plurality of nodes, data for storage in the storage system. The at least one processor may be further configured to write, via the first node, the data to one or more data pages of a log buffer of the first node. The at least one processor may be further configured to generate, via the first node, one or more page descriptors associated with the one or more data pages. The at least one processor may be further configured to send the one or more page descriptors to a second node concurrently with the writing of the data to the one or more data pages of the log buffer of the first node.

One or more of the following example features may be included. The one or more page descriptors may be written, via the second node, to a page descriptor buffer of the second node. In response to writing the one or more page descriptors to the page descriptor buffer of the second node, an acknowledgement signal may be sent to the first node indicating that the one or more page descriptors are written to the page descriptor buffer of the second node. An acknowledgement signal may be sent to a computing device that sent the data to the storage system in response to determining that the data is written to the one or more data pages of the log buffer of the first node, and receiving the acknowledgement signal from the second node indicating that the one or more page descriptors are written to the page descriptor buffer. A last confirmed page descriptor associated with a last data page of the one or more data pages written to the log buffer of the first node may be defined. The last confirmed page descriptor associated with the last data page written to the log buffer of the first node may be sent to the second node. It may be determined that the first node has failed. It may be determined, via the second node, the last confirmed page descriptor associated with the last data page written to the log buffer of the first node. One or more subsequent page descriptors may be verified, on the first node, based upon, at least in part, the last confirmed page descriptor associated with the last data page written to the log buffer of the first node. One or more ranges of confirmed page descriptors associated with a plurality of data pages written to the log buffer of the first node may be defined. The one or more ranges of confirmed page descriptors associated with a plurality of data pages written to the log buffer of the first node may be sent to the second node.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
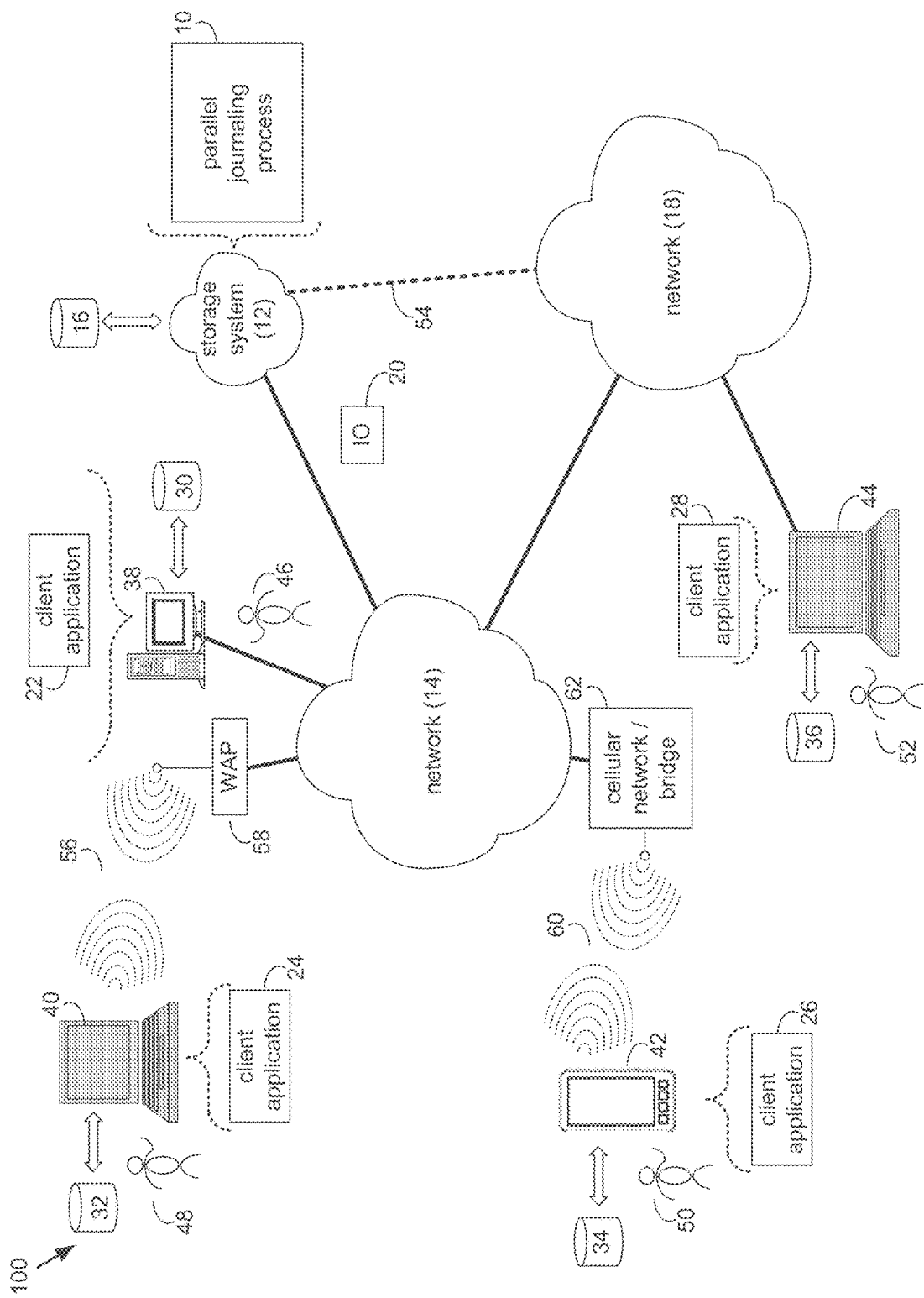
FIG. 1 is an example diagrammatic view of a storage system and a parallel journaling process coupled to a distributed computing network according to one or more example implementations of the disclosure.

System Overview:

Referring to FIG. 1, there is shown parallel journaling process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of parallel journaling process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of parallel journaling process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a parallel journaling process, such as parallel journaling process 10 of FIG. 1, may include but is not limited to, receiving, via a first node of a plurality of nodes, data for storage in a storage system. The data may be written, via the first node, to one or more data pages of a log buffer of the first node. One or more page descriptors associated with the one or more data pages may be generated via the first node. The one or more page descriptors may be sent to a second node concurrently with the writing of the data to the one or more data pages of the log buffer of the first node.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
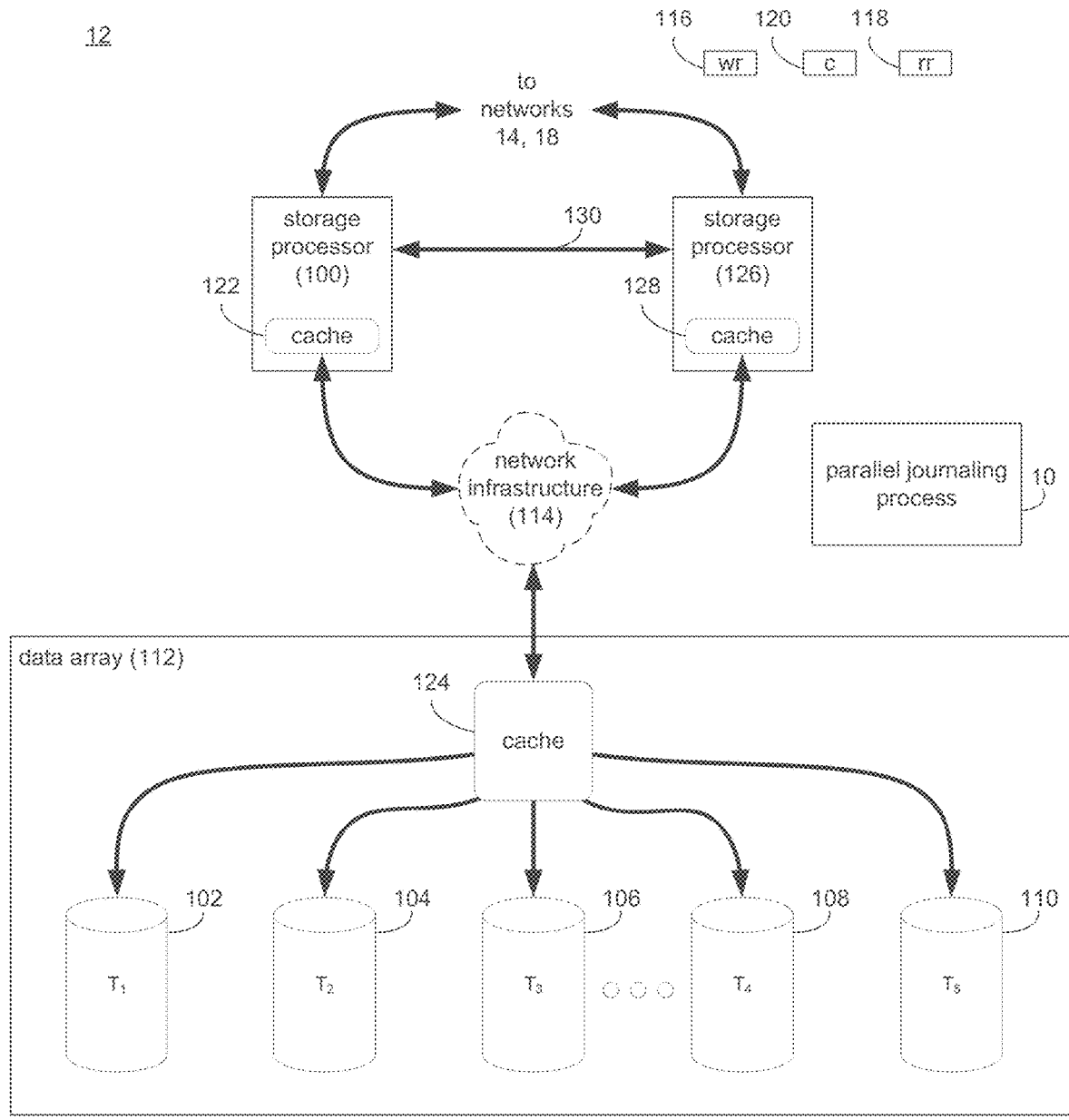
FIG. 2 is an example diagrammatic view of the storage system of FIG. 1 according to one or more example implementations of the disclosure.
Figure 3:
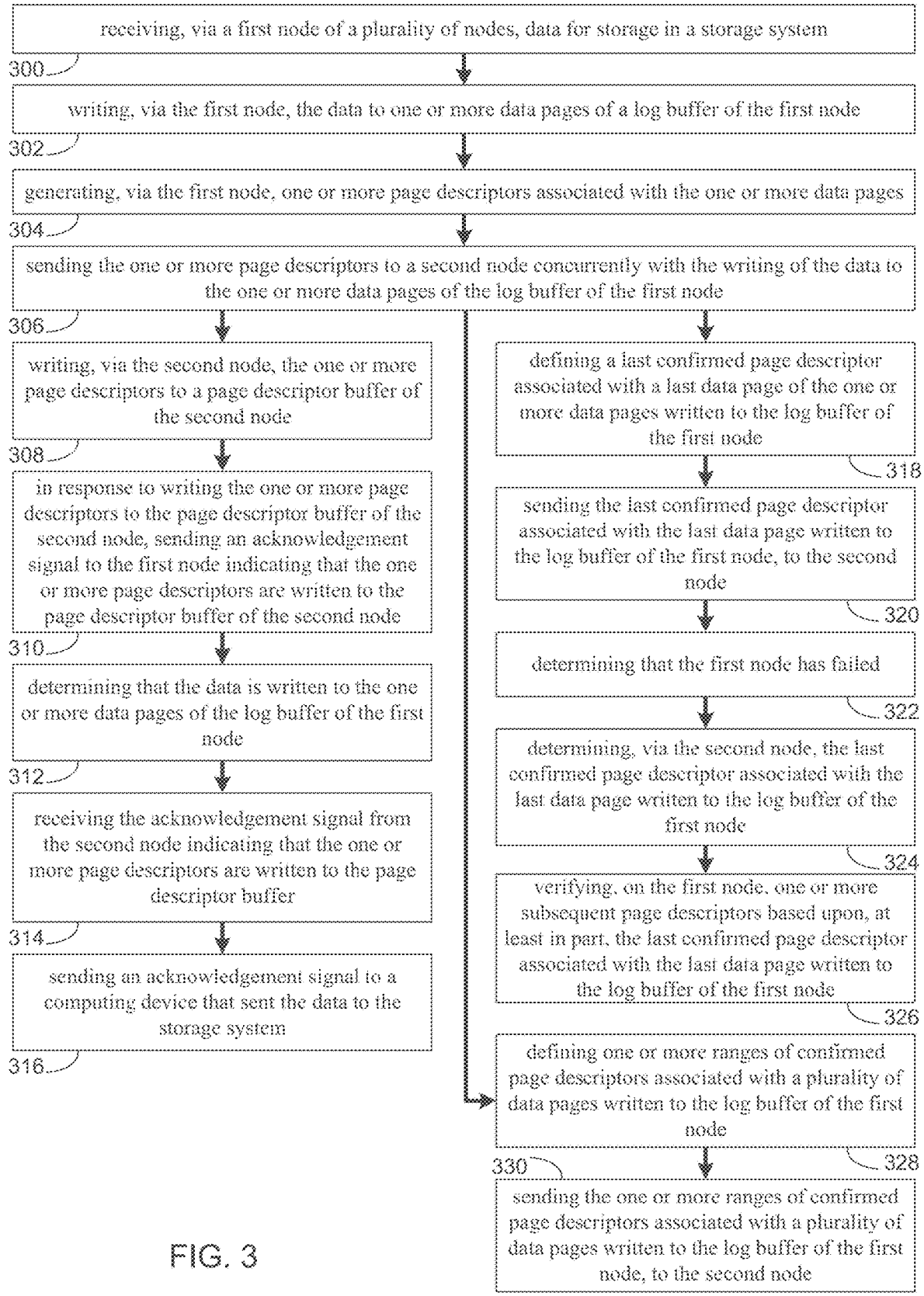
FIG. 3 is an example flowchart of the parallel journaling process of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of parallel journaling process 10. The instruction sets and subroutines of parallel journaling process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of parallel journaling process 10 may be stored on storage devices (and/or executed by processors and memory architectures) that are external to storage system 12.

As discussed above, various IO requests or commands (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of parallel journaling process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of parallel journaling process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of parallel journaling process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of parallel journaling process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130). In some implementations, one of the storage processors may fail which may cause a significant amount of desynchronization between the storage processors.

The Parallel Journaling Process:

Referring also to FIGS. 3-10 and in some implementations, parallel journaling process 10 may receive 300, via a first node of a plurality of nodes, data for storage in a storage system. The data may be written 302, via the first node, to one or more data pages of a log buffer of the first node. One or more page descriptors associated with the one or more data pages may be generated 304 via the first node. The one or more page descriptors may be sent 306 to a second node concurrently with the writing of the data to the one or more data pages of the log buffer of the first node.

As will be discussed in greater detail below, implementations of the present disclosure may provide parallel journaling on multiple nodes of an active-active storage cluster that may reduce IO write latency (due to parallelization and by reducing the number of CPU scheduling events) and may guarantee consistent and fast recovery in case of failures.

Figure 4:
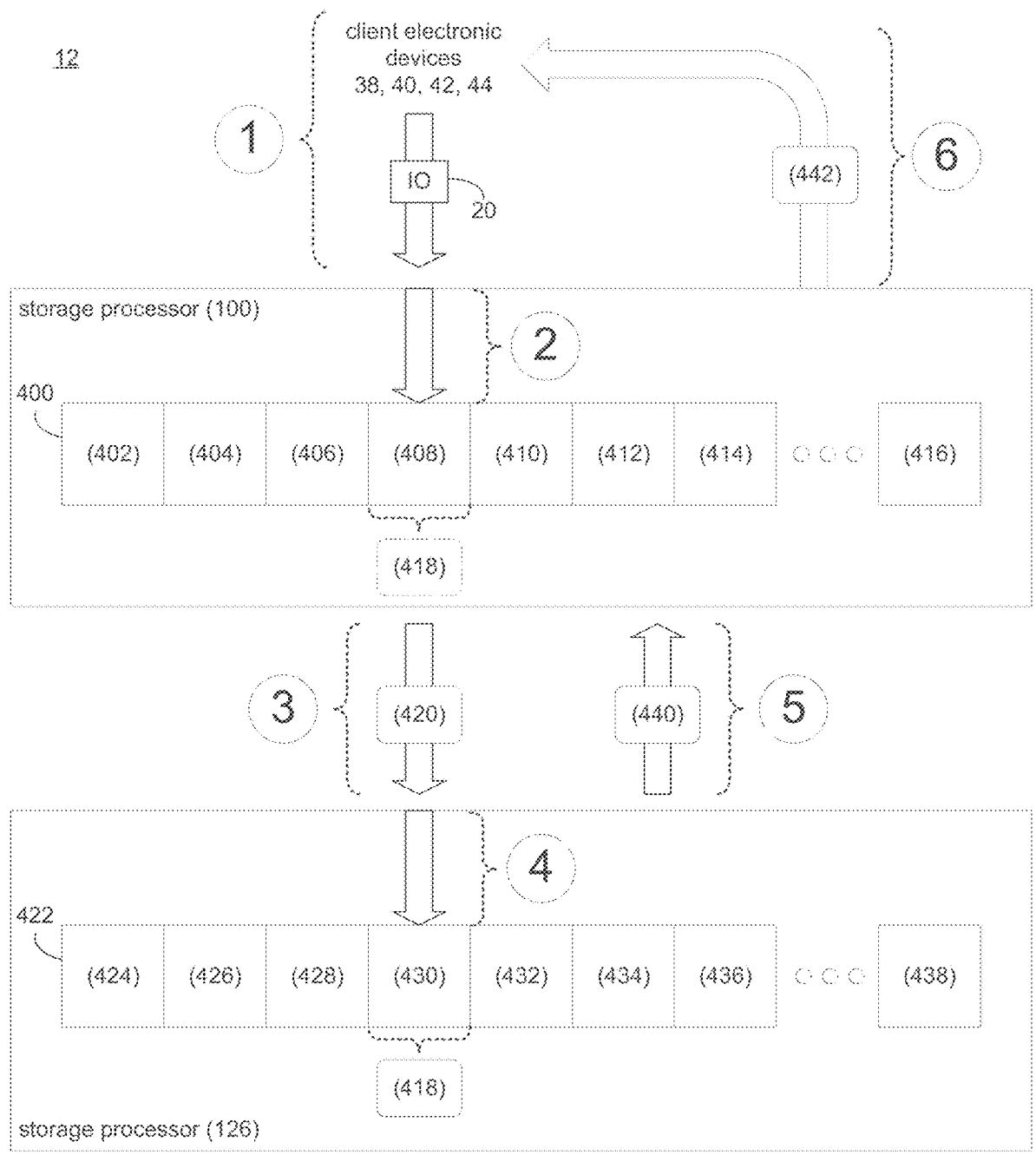
FIGS. 4-10 are example diagrammatic views of journaling data via log buffers and page descriptor buffers of multiple storage processors according to one or more example implementations of the disclosure.

In some implementations, parallel journaling process 10 may receive 300, via a first node of a plurality of nodes, data for storage in a storage system. Referring also to the example of FIG. 4 and in some implementations, parallel journaling process 10 may receive 300 data (e.g., content of input/output (IO) request 20) via a first node (e.g., storage processor 100) of a plurality of nodes (e.g., storage processors 100, 126). In some implementations, the data may be received in the form of an IO request (e.g., a write IO request) from one or more client electronic devices (e.g., client electronic devices 38, 40, 42, 44). As shown in the example of FIG. 4, receiving 300, via a first node of a plurality of nodes, data for storage in a storage system may be represented by the circle including the number "1" as a first action. However, it will be appreciated that other actions or steps may precede receiving 300 data for storage in a storage node.

In some implementations, multiple storage processors (e.g., storage processors 100, 126) may be configured in an active/active configuration such that data received by one storage processor may be made available to the other storage processor(s). In the event of one storage processor failure, another storage processor may continue to process IO requests on the storage system. As shown in FIG. 4, suppose a storage processor (e.g., storage processor 100) receives an IO request (IO request 20) for storing data within the storage system (e.g., storage system 12). In this example, parallel journaling process 10 may receive 300 the data (e.g., IO request 20) at a storage processor (e.g., storage processor 100) communicatively coupled to a data array (e.g., data array 112).

As shown in the example of FIG. 4 and in some implementations, parallel journaling process 10 may write 302, via the first node, the data to one or more data pages of a log buffer of the first node, wherein the log buffer includes a plurality of data pages for flushing to the storage system. For example, parallel journaling process 10 may write 302 the data to a head entry of a log buffer, where the log buffer may include a plurality of data entries or data pages for flushing to the storage system.

As shown in FIG. 4 and in some implementations, a storage processor (e.g., storage processor 100) of a storage system (e.g., storage system 12) may include a log buffer (e.g., log buffer 400) or log journal configured to store data received for storage in the storage system. In some implementations, the log buffer (e.g., log buffer 400) may be a circular ring buffer. A circular ring buffer may generally include a data structure of a defined capacity that is configured to store data. Data may be added to the circular ring buffer until the circular ring buffer is full. Once the circular ring buffer is filled, new data may overwrite the oldest data previously written to the circular ring buffer. In this manner, the circular ring buffer may continuously write new data despite a limited size by overwriting old data with new data. However, it will be appreciated that other types of buffers may be used within the scope of the present disclosure.

In one example, a log buffer (e.g., log buffer 400) may include a data page log buffer, where the log buffer holds newly received dirty/update pages before they are written to a final storage location in the storage system (e.g., within data array 112). In some implementations, the log buffer may be large (e.g., two million four kilobyte (4 KB) pages (i.e., a log buffer with an eight gigabyte (8 GB)) capacity). However, it will be appreciated that the log buffer (e.g., log buffer 400) may be of any size or capacity within the scope of the present disclosure.

Referring again to the example of FIG. 4 and in some implementations, a log buffer (e.g., log buffer 400) may include a plurality of data pages (e.g., data pages 402, 404, 406, 408, 410, 412, 414, 416). In some implementations, the plurality of data pages (e.g., data pages 402, 404, 406, 408, 410, 412, 414, 416) of the log buffer (e.g., log buffer 400) may include portions of data for flushing to the storage system (e.g., flushing from storage processor 100 to data array 112). As discussed above and in some implementations, each data page of log buffer 400 may be a page of received dirty data to be flushed to a final storage location in the storage system (e.g., within data array 112). While an example of a log buffer with e.g., eight data pages or entries has been described, it will be appreciated that any number of data pages or entries may be used within the scope of the present disclosure.

In one example, suppose parallel journaling process 10 receives 300 data from a client electronic device (e.g., client electronic device 38) for storage in the storage system (e.g., storage system 12). In this example, data may be received in the form of a write IO request (e.g., IO request 20). Parallel journaling process 10 may write 302 the data of IO request 20 to one or more data pages (e.g., data page 408) of the log buffer (e.g., log buffer 400). While this example includes only a single data page, it will be appreciated that parallel journaling process 10 may write 302 any number of data pages to the log buffer within the scope of the present disclosure. In the example of FIG. 4, writing 302 the data to one or more data pages of a log buffer of the first node may be represented by the circle including the number "2" as a second action. However, it will be appreciated that other actions or steps may occur after receiving 300 the data and before writing 302 the data to one or more data pages of a log buffer of the first node within the scope of the present disclosure.

In some implementations, writing 302 the data to one or more data pages of the log buffer of the first node may persist the data. However, the data may not be recovered if the first node fails. Further, writing 302 the data to one or more data pages of the log buffer of the first node may involve waiting for CPU core availability (i.e., available CPU cores to write the one or more data pages to the log buffer). Additionally, the time required waiting for CPU core yield before writing 302 the data to the one or more data pages of the log buffer may be significant. As will be discussed in greater detail below, parallel journaling process 10 may allow parallel journaling of the data to each of the first node and the second node, thus reducing the amount of time spent waiting for CPU core availability before an acknowledge signal is sent back to the client electronic device that issued or sent the data for storage.

In some implementations, parallel journaling process 10 may generate 304, via the first node, one or more page descriptors associated with the one or more data pages. In some implementations, a page descriptor may generally include metadata associated with or about data being written to a data page of a log buffer. For example, a page descriptor may include a checksum, hash, or other data integrity measure for a particular data page describing where the data page should be in a volume or other storage container. In this manner and as will be discussed in greater detail below, a page descriptor may be used to point to the location of the corresponding data page during recovery and to invalidate the page descriptor if verification fails (i.e., the page descriptor indicates that the data page has changed or does not match).

Returning to the above example, in response to receiving 300 the data (e.g., content of write IO request 20) to be stored in the storage system (e.g., storage system 12), parallel journaling process 10 may generate 304 one or more page descriptors associated with the data (e.g., content of write IO request 20). In some implementations, the one or more page descriptors may reference or point to the one or more data pages the data is being written to. In this manner and as will be discussed in greater detail below, the one or more page descriptors may be generated 304 by parallel journaling process 10 while parallel journaling process 10 writes 302 the data to the one or more data pages of the log buffer. Accordingly, the one or more page descriptors associated with the one or more data pages may be generated 304 before the data is written to or during the writing of the data to the one or more data pages. In the example of FIG. 4, parallel journaling process 10 may generate 304 one or more page descriptors (e.g., page descriptor 418) associated with the one or more data pages (e.g., data page 408) of the log buffer (e.g., log buffer 400) that the data (e.g., content of write IO request) is being written 302 to. As shown in FIG. 4, page descriptor 418 is shown in dashed lines adjacent to data page 408 to represent that page descriptor 418 is associated with data page 408 but is not stored in data page 408.

In the example of FIG. 4 and in some conventional approaches for journaling data in an active-active storage cluster (e.g., storage system 12), the one or more page descriptors are sent to a second node following the writing of the data to the one or more data pages of the log buffer. In this conventional approach, the action of sending page descriptors to the second node is completed serially after the data is written to the data pages of the log buffer of the first node. As shown in the example of FIG. 4, this action of sending the one or more page descriptors via signal 420 may be represented by the circle including the number "3".

In the example of FIG. 4, suppose a second node (e.g., storage processor 126) includes a page descriptor buffer (e.g., page descriptor buffer 422) or page descriptor journal with one or more data entries or page descriptor entries (e.g., data entries 424, 426, 428, 430, 432, 434, 436, 438). In this example, the page descriptor 418 may be written to data entry 430 of page descriptor buffer 422 of storage processor 126. As shown in FIG. 4, page descriptor 418 is shown in solid lines adjacent data entry 430 to represent that page descriptor 418 is stored in data entry 430 of page descriptor buffer 422. As shown in the example of FIG. 4, this action of writing the one or more page descriptors to the second node may be represented by the circle including the number "4". At this point, the new data may be considered persisted as it is known and referenced on both nodes (e.g., storage processors 100, 126) and is recoverable in case of node(s) failure.

In some implementations and continuing with the discussion of conventional approaches for journaling, an acknowledgement signal (e.g., acknowledgement signal 438) may be sent from the second node (e.g., storage processor 126) to the first node (e.g., storage processor 100) in response to writing page descriptor 418 to data page 430. As shown in the example of FIG. 4, this action of sending the acknowledgement signal may be represented by the circle including the number "5".

In some implementations and continuing with the discussion of conventional approaches for journaling, the first node (e.g., storage processor 100) may receive the acknowledgement signal (e.g., acknowledgement signal 440) from the second node (e.g., storage processor 126) and may send an acknowledgement signal (e.g., acknowledgement signal 442) to the computing device (e.g., client electronic device 38) that originally issued or sent the IO request (e.g., IO request 20). Accordingly, as the actions of FIG. 4 according to conventional approaches are completely serialized, the IO latency for this storage system is sum of time intervals that each separate action takes. Moreover, as each action discussed above involves waiting for CPU core availability and may require rescheduling (in terms of a queue scheduler), the inefficiencies introduced because of CPU core scheduling may be even more detrimental to IO latency than the combination of individual, serial action times. As will be discussed in greater detail below, parallel journaling process 10 may reduce this IO latency by parallelizing the writing 302 of data pages to the log buffer of the first node and the sending 306 of the page descriptors associated with the data pages to the page descriptor buffer of the second node.

In some implementations, parallel journaling process 10 may send 306 the one or more page descriptors to a second node concurrently with the writing of the data to the one or more data pages of the log buffer of the first node. Referring also to the example of FIG. 5 and in some implementations, suppose that, as discussed above, parallel journaling process 10 receives 300 IO request 20 for storing data in data array 112. In this example, parallel journaling process 10 may generate 304 page descriptor 418 associated with data page 408 of log buffer 400 of storage processor 100. As discussed above, parallel journaling process 10 may generate 304 page descriptor 418 before the data of IO request 20 is written to data page 408. In this example, parallel journaling process 10 may send 306 page descriptor 418 to storage processor 126 concurrently or in parallel with writing 302 the data of IO request 20 to data page 408 of log buffer 400 of storage processor 100. In some implementations, concurrently or in parallel may generally indicate that the sending 306 of the one or more page descriptors occurs during substantially the same time period as the writing 302 of the data to the one or more data pages.

Figure 5:
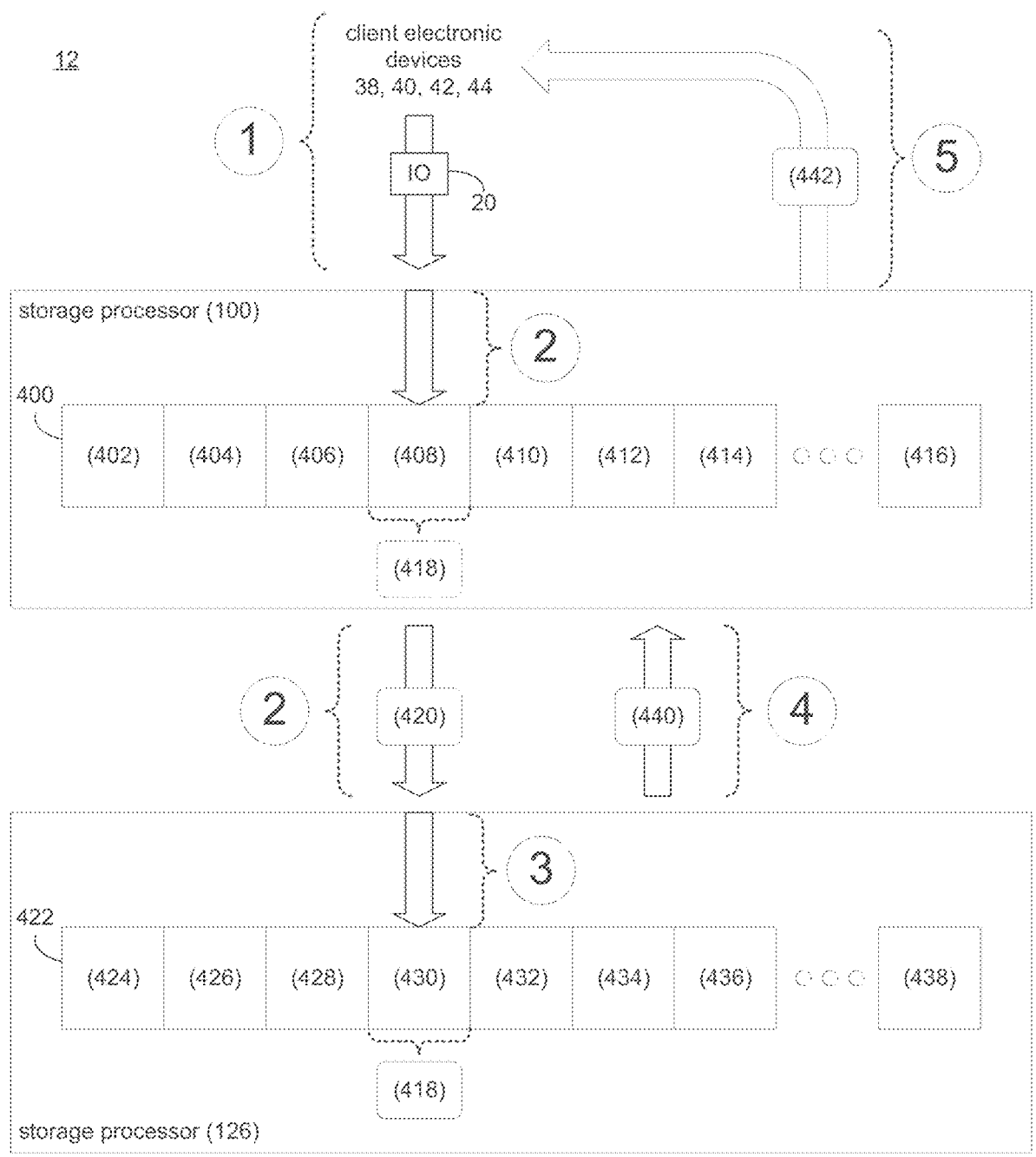

For example, suppose parallel journaling process 10 identifies one or more data pages (e.g., data page 408) for writing new data into the log buffer (e.g., log buffer 400) of the first node (e.g., storage processor 100). In this example, the one or more data pages where the new data is written may start with the head of the log buffer. In response to identifying data page 408 for writing new data, parallel journaling process 10 may generate 304 page descriptor 418 referencing data page 408. In this example, parallel journaling process 10 may begin writing 302 the new data to data page 408 in parallel with sending 306 page descriptor 418 associated with data page 408 to storage processor 126. In some implementations, either the writing 302 of data page 408 or the sending 306 of page descriptor 418 may begin before the other action. However, it will be appreciated that, unlike in conventional journaling approaches, the sending 306 of page descriptor 418 will not be limited to starting only after data page 408 is written 302 to log buffer 400 of storage processor 100. As shown in the example of FIG. 5, the concurrent or parallel actions of writing 302 the data to the one or more data pages of a log buffer of the first node and sending 306 the one or more page descriptors to the second node may be represented by the circles including the number "2". In this manner, writing 302 the data to the one or more data pages of the log buffer of the first node and the sending 306 of the one or more page descriptors to the second node may be concurrent.

In some implementations, parallel journaling process 10 may write 308, via the second node, the one or more page descriptors to a page descriptor buffer of the second node. Referring again to the example of FIG. 5, suppose parallel journaling process 10 generates 304 page descriptor 418 that is associated with data page 408 where data from IO request 20 is being written. In this example, parallel journaling process 10 may send 306 page descriptor 418 to storage processor 126. In response to receiving page descriptor 418, storage processor 126 may write 308 page descriptor 418 to page descriptor buffer 420. Specifically in this example, parallel journaling process 10 may write 308 page descriptor 418 to data entry 430 of page descriptor buffer 422. As shown in the example of FIG. 5, this action of writing the one or more page descriptors to the page descriptor log may be represented by the circle including the number "3". However and as will be discussed in greater detail below, the new data may not be persisted and referenced on both nodes (e.g., storage processors 100, 126) until the first node (e.g., storage processor 100) completes the writing 302 of the new data to the data page 408 of log buffer 400.

In some implementations and in response to writing 308 the one or more page descriptors to the page descriptor buffer of the second node, parallel journaling process 10 may send 310 an acknowledgement signal to the first node indicating that the one or more page descriptors are written to the page descriptor buffer of the second node. Referring again to the example of FIG. 5 and in some implementations, an acknowledgement signal (e.g., acknowledgement signal 440) may be sent 310 from the second node (e.g., storage processor 126) to the first node (e.g., storage processor 100) in response to writing 308 page descriptor 418 to the page descriptor buffer (e.g., data page 430 of page descriptor buffer 422). As shown in the example of FIG. 5, this action of sending the acknowledgement signal may be represented by the circle including the number "4".

In some implementations, parallel journaling process 10 may send an acknowledgement signal to a computing device that sent the data to the storage system in response to determining 312 that the data is written to the one or more data pages of the log buffer of the first node and receiving 314 the acknowledgement signal from the second node indicating that the one or more page descriptors are written to the page descriptor buffer. As discussed above, because the writing 302 of the data to the one or more data pages of the log buffer of the first node is in parallel with the sending 306 of the one or more page descriptors to the second node, parallel journaling process 10 may send 316 an acknowledgement signal to a computing device when: 1) parallel journaling process 10 determines 312 that the data is written to the one or more data pages of the log buffer of the first node; and 2) parallel journaling process 10 receives 314, via the first node, the acknowledgement signal from the second node indicating that the one or more page descriptors are written to the page descriptor buffer of the second node.

Referring again to the example of FIG. 5 and in some implementations, suppose parallel journaling process 10 determines 312 that the data of IO request 20 is written 302 to data page 408. In this example, parallel journaling process 10 may determine whether an acknowledgement signal (e.g., acknowledge signal 438) has been received by storage processor 100. In response to determining 312 that the data of IO request 20 is written 302 to data page 408 and that acknowledgement signal 440 has been received indicating the page descriptor 418 is written 308 to page descriptor buffer 422 of storage processor 126, parallel journaling process 10 may send 306 acknowledgement signal 442 to client electronic device 38 that sent IO request 20 to storage processor 100. As shown in the example of FIG. 5, this action of sending the acknowledgement signal may be represented by the circle including the number "5".

In some implementations, parallel journaling process 10 may define 318 a last confirmed page descriptor associated with a last data page of the one or more data pages written to the log buffer of the first node. For example, due to parallelizing and reducing the number of CPU scheduling events, parallel journaling process 10 may reduce IO write latency. However, writing data pages and sending page descriptors concurrently may introduce a consistency problem. Suppose the second node successfully completes writing the one or more page descriptors to the page descriptor buffer, but the first node crashes before it completes writing pages to its log buffer. In this example, the one or more page descriptors may be persisted (and considered valid in case of recovery), while the one or more page descriptors may point to invalid data as the data pages were not written to the first node. Conventional approaches require the scanning of the entire page descriptor buffer and comparing checksums to stored data. In some implementations and to avoid these types of data corruptions and to guarantee consistent recovery in reasonable time, parallel journaling process 10 may define 318 a last confirmed page descriptor associated with a last data page of the one or more data pages to be written to the log buffer of the first node. A last confirmed page descriptor may generally include a page descriptor sequence number of the last successfully stored data page in the log buffer of the first node. In this manner, parallel journaling process 10 may improve avoid a consistency problem without requiring scanning the entire page descriptor buffer.

Figure 6:
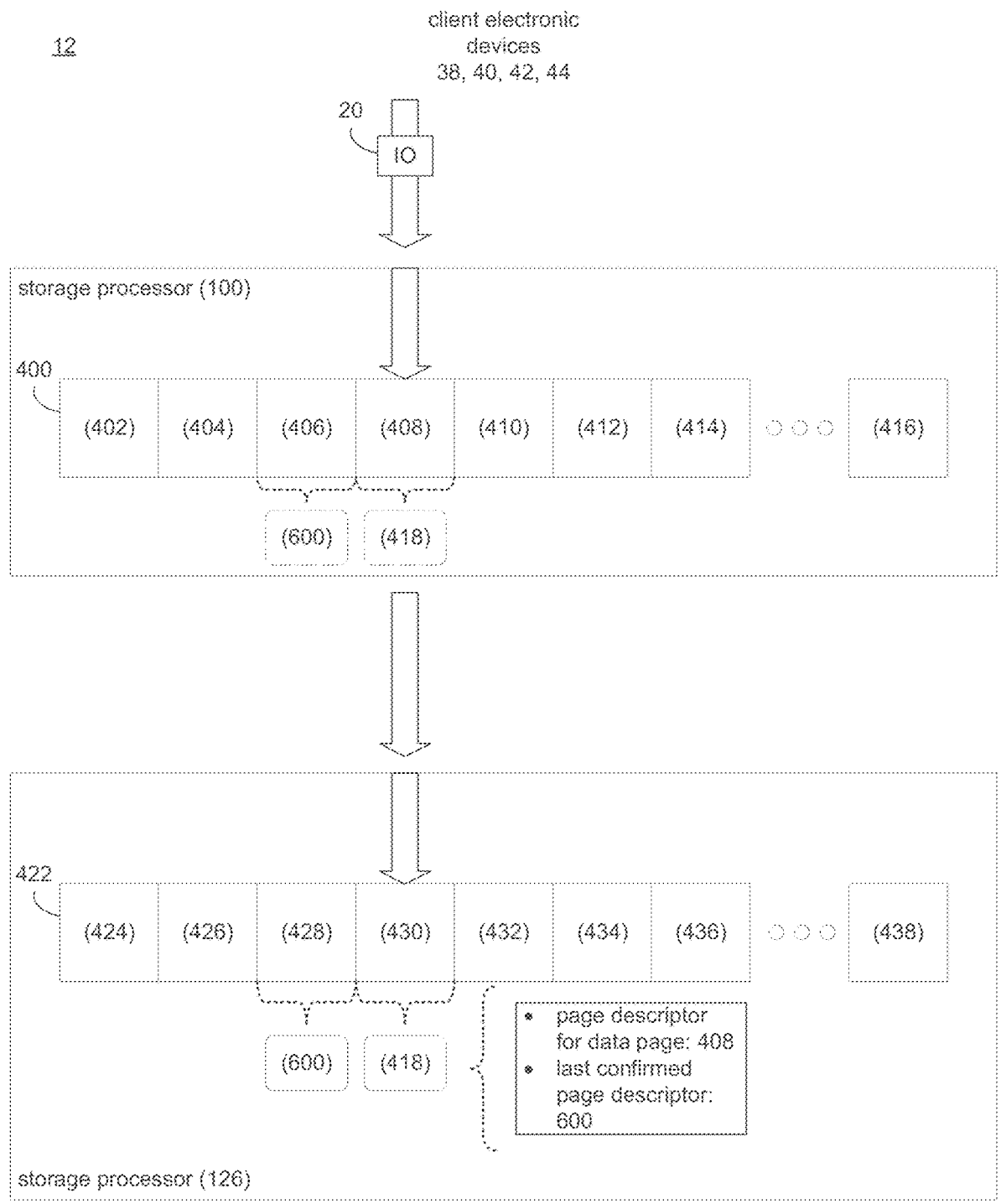

Referring also to the example of FIG. 6 and in some implementations, suppose parallel journaling process 10 receives 300 new data (e.g., data of IO request 20) for storage in a storage system (e.g., storage system 12). As discussed above and in some implementations, parallel journaling process 10 may generate 304 one or more page descriptors (e.g., page descriptor 418) associated with the one or more data pages (e.g., data page 408) that the new data (e.g., data of IO request 20) is being written to within a log buffer (e.g., log buffer 400) of the first node (e.g., storage processor 100). In some implementations, parallel journaling process 10 may define 318 a last confirmed page descriptor associated with a last data page of the one or more data pages written to the log buffer of the first node. In the example of FIG. 6, parallel journaling process 10 may define 318 the page descriptor associated with data page 406 as the last confirmed page descriptor (e.g., page descriptor 600).

In some implementations, parallel journaling process 10 may send 320 the last confirmed page descriptor associated with the last data page written to the log buffer of the first node, to the second node. In some implementations, the one or more page descriptors (e.g., page descriptor 418) may include the last confirmed page descriptor (e.g., page descriptor 600 associated with data page 406 that was the last data page to be written to log buffer 400 of storage processor 100). Accordingly, by sending 320 the last confirmed page descriptor (e.g., page descriptor 600), parallel journaling process 10 may determine at what point to begin verifying page descriptors against data pages in the log buffer of the first node if and when the first node fails.

Figure 7:
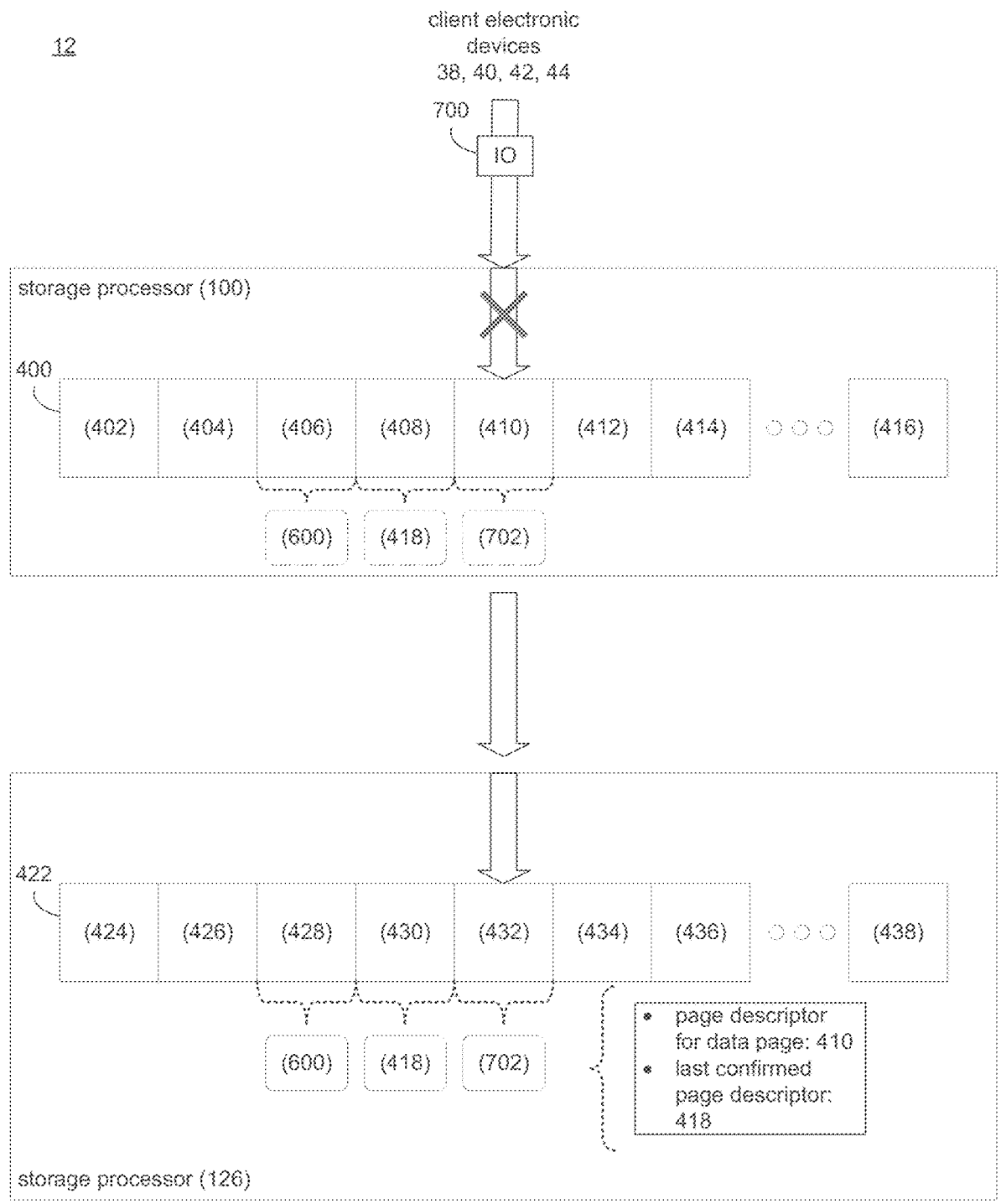
Figure 8:
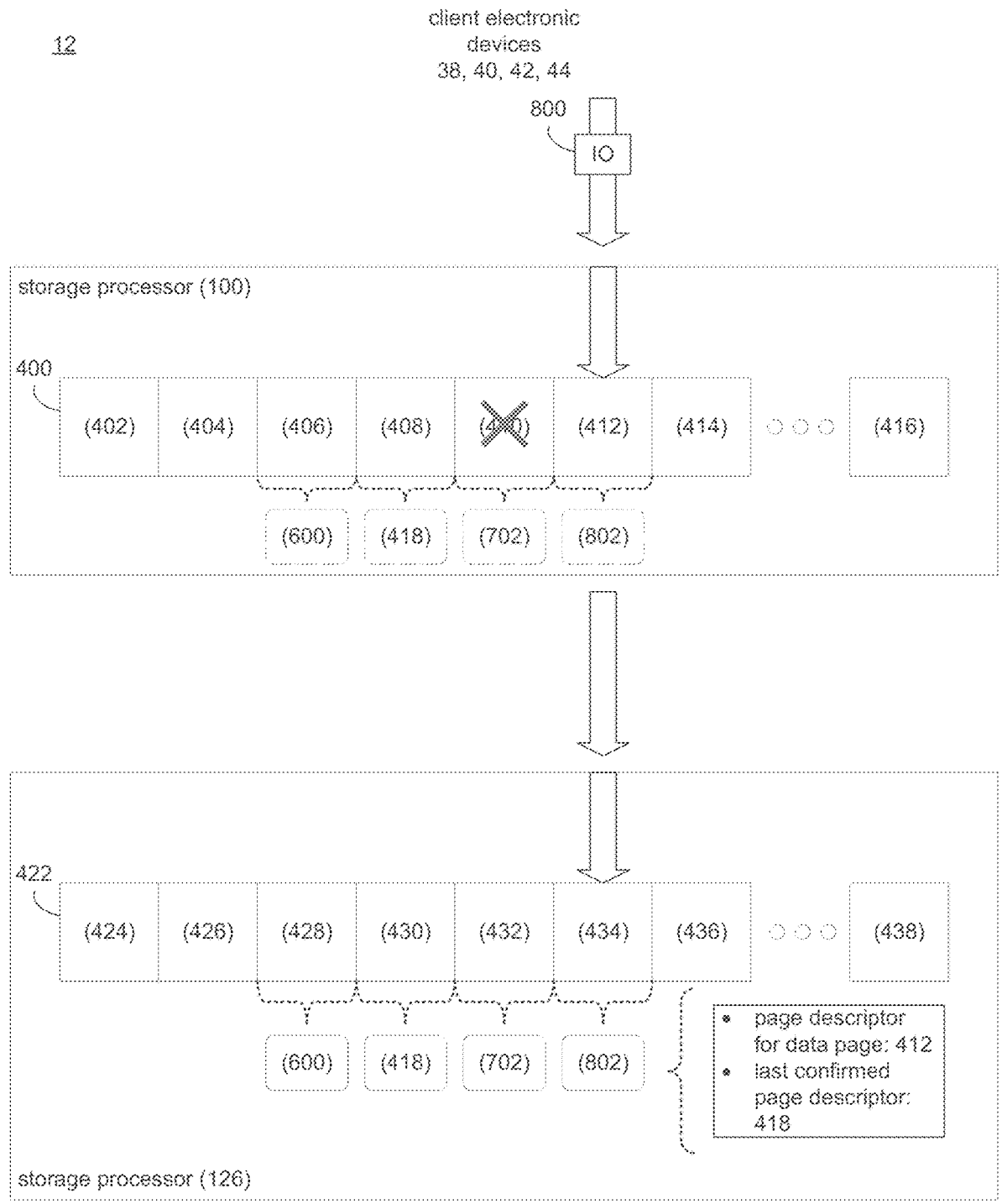
Figure 9:
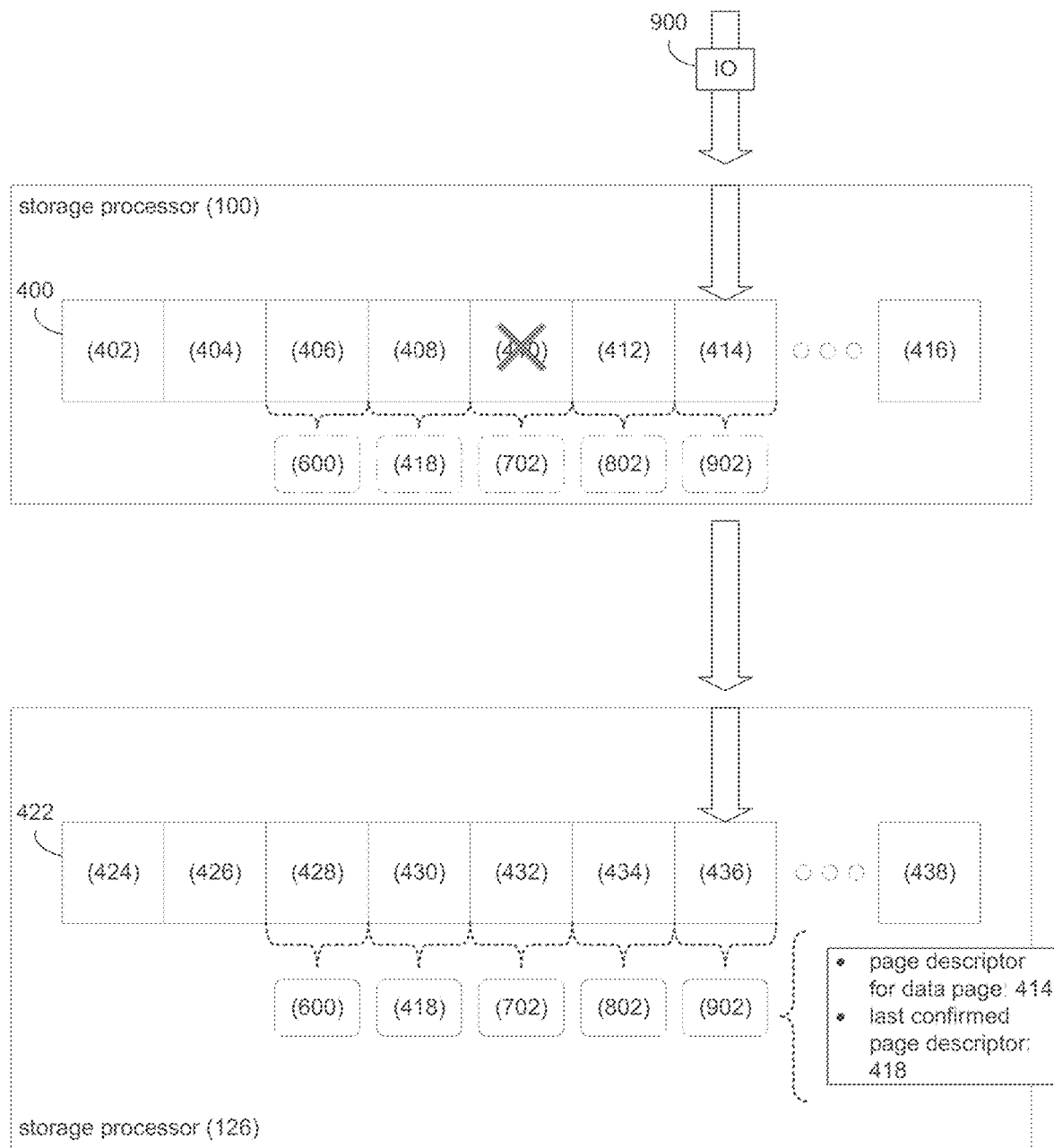
Figure 10:
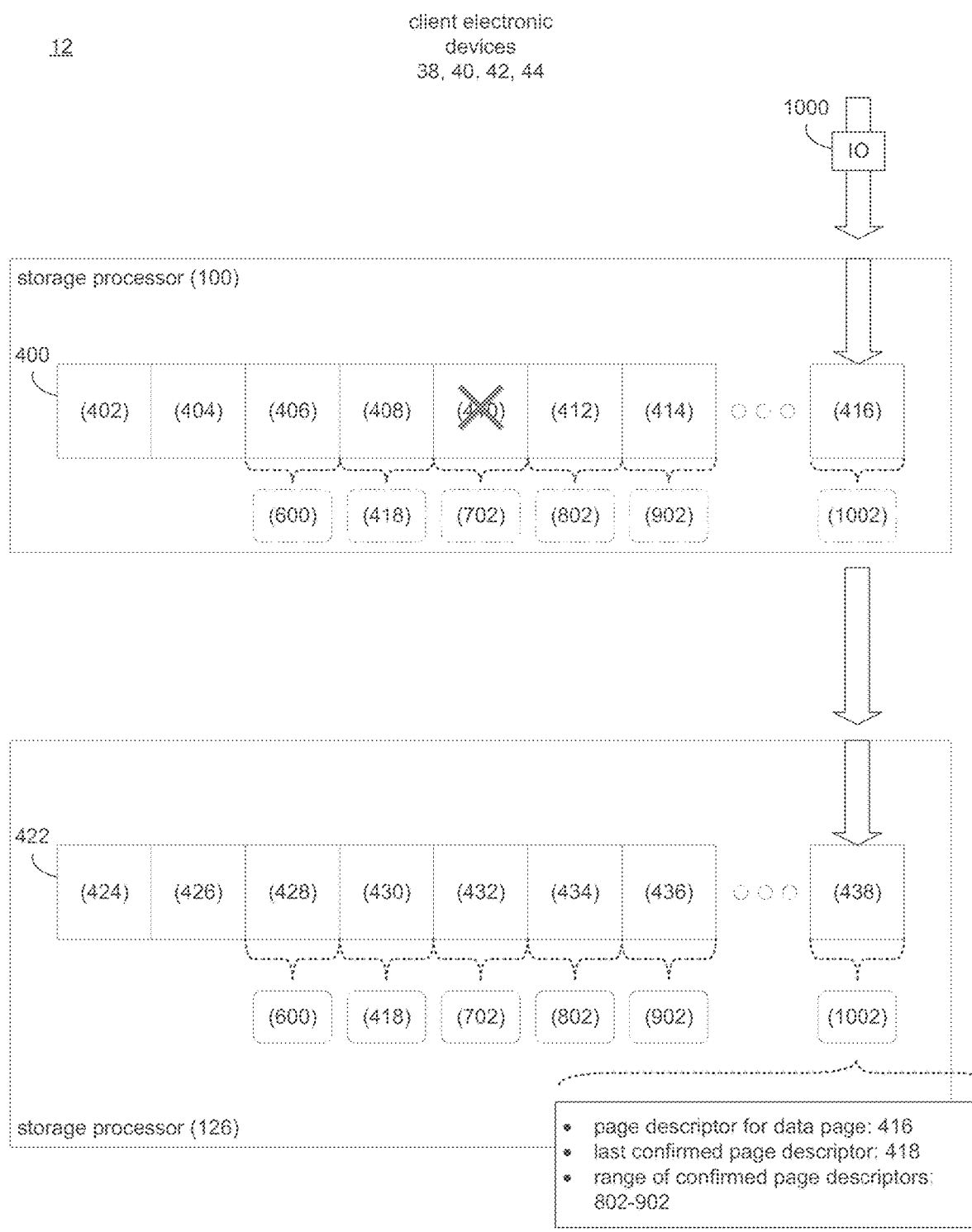

Referring also to the example of FIG. 7 and in some implementations, suppose parallel journaling process 10 receives 300 IO request 700 for storing new data in data array 112. In this example, parallel journaling process 10 may generate 304 page descriptor 702 associated with data page 410 where the new data of IO request 700 will be written to. Additionally, parallel journaling process 10 may define 318 a last confirmed page descriptor associated with a last data page of the one or more data pages written to the log buffer of the first node. In the example of FIG. 7, parallel journaling process 10 may define 318 the page descriptor associated with data page 408 as the last confirmed page descriptor (e.g., page descriptor 418). Continuing with this example, parallel journaling process 10 may begin writing 302 the new data to data page 410 and may send 320 page descriptor 702 (including the last confirmed page descriptor) to the second node.

In some implementations, parallel journaling process 10 may determine 322 that the first node has failed. Referring again to the example of FIG. 7 and continuing with the above example, suppose storage processor 100 fails (e.g., crashes or otherwise ceases to write the new data to log buffer 400) before the new data of IO 700 is written to data page 410 of log buffer 400. In this example, further suppose that page descriptor 702 is successfully written to page descriptor buffer 420 of storage processor 126.

In some implementations, parallel journaling process 10 may determine 324, via the second node, the last confirmed page descriptor associated with the last data page written to the log buffer of the first node. For example, parallel journaling process 10 may determine 324 the last confirmed page descriptor associated with the last data page written to the log buffer of the first node in response to determining that the first node has failed. Returning to the above example, parallel journaling process 10 may determine 324 page descriptor 418 associated with data page 408 is the last confirmed page descriptor and that data page 408 is the last data page written to log buffer 400 before storage processor 100 failed.

In some implementations, parallel journaling process 10 may verify 326, on the first node, one or more subsequent page descriptors based upon, at least in part, the last confirmed page descriptor associated with the last data page written to the log buffer of the first node. Returning to the above example, parallel journaling process 10 may verify 326, on the first node, one or more subsequent page descriptors (e.g., page descriptor 702) against the data pages (e.g., data pages 410) of the first node (e.g., storage processor 100) based upon, at least in part, the last confirmed page descriptor (e.g., page descriptor 418) associated with the last data page written to the log buffer of the first node (e.g., data page 408). In this example, because parallel journaling process 10 may determine that all previous page descriptors (e.g., page descriptors written to page descriptor log 420 before and including page descriptor 418) are consistent (i.e., corresponding data pages are written in log buffer 400), parallel journaling process 10 may verify 326 the subsequent page descriptors (e.g., page descriptor 702) against the one or more data pages (e.g., data page 410) of the log buffer of the first node. In this manner, parallel journaling process 10 may reduce the amount of time spent verifying page descriptors in a page descriptor log of a second node. Accordingly, the process of recovering data to the first node may be improved.

In some implementations, parallel journaling process 10 may define 328 one or more ranges of confirmed page descriptors associated with a plurality of data pages written to the log buffer of the first node. For example, in the case of a solid state disk (SSD) hiccup, writing of some data pages may be delayed because of a random SSD hiccup. In a SSD hiccup, not all of the data pages may be confirmed because of a delay in writing one or more data pages. If a storage node crashes during this point, there may be many data pages and page descriptors to verify. Accordingly, parallel journaling process 10 may reduce the number/window of unconfirmed data pages by defining one or more ranges of confirmed page descriptors associated with a plurality of data pages written to the log buffer of the first node.

Referring also to the example of FIGS. 6-10 and in some implementations, suppose parallel journaling process 10 receives 300 IO requests 20, 700, 800, 900, and 1000 for storing new data in storage system 12. As discussed above and in some implementations, parallel journaling process 10 may generate 304 page descriptors 418, 702, 802, 902, and 1002 associated with the data pages 408, 410, 412, 414, and 416, respectively, that the new data of each IO request are to be written to. In these examples, parallel journaling process 10 may write 302 the new data of each IO request to data pages 408, 410, 412, 414, and 416. Suppose that during the writing of new data to data page 410, log buffer 400 has a solid state disk (SSD) hiccup where a portion of data is not written to log buffer 400. In this example, data pages 408, 412, 414, and 416 may be written to log buffer 400 while the writing of data page 410 is delayed. Additionally and in this example, data page 408 may be written after data pages 412, 414, and 416 and page descriptors 418, 702, 802, 902, and 1002 may be written to page descriptor buffer 420 of storage processor 126.

As discussed above regarding the last confirmed page descriptor, parallel journaling process 10 may define 328 one or more ranges of confirmed page descriptors associated with a range of data pages successfully written to the log buffer. Continuing with the above examples of FIGS. 6-10, parallel journaling process 10 may define 318 a last confirmed page descriptor as page descriptor 418 and may define 328 a range of confirmed page descriptors to include page descriptors 802, 902, 1002 associated with data pages 412 and 414 that are successfully written to log buffer 400.

In some implementations, parallel journaling process 10 may send 330 the one or more ranges of confirmed page descriptors associated with a plurality of data pages written to the page descriptor buffer of the first node, to the second node. For example, the one or more page descriptors (e.g., page descriptor 1002) may include the last confirmed page descriptor (e.g., page descriptor 418 associated with data page 408 that was the last data page to be written to log buffer 400 of storage processor 100) and range of confirmed page descriptors 802-902. Accordingly, by sending 330 the last confirmed page descriptor (e.g., page descriptor 418) and the range of confirmed page descriptors (e.g., page descriptors 802-902), parallel journaling process 10 may determine which page descriptors to verify against data pages in the log buffer of the first node if and when the first node fails. In this example, parallel journaling process 10 may only verify page descriptor 702 as last confirmed page descriptor 418 is associated with data page 408 and range of confirmed page descriptions includes page descriptors 802 and 902.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   receiving, via a first node of a plurality of nodes, data for storage in a storage system;
   writing, via the first node, the data to one or more data pages of a log buffer of the first node;
   generating, via the first node, one or more page descriptors associated with the one or more data pages;
   sending the one or more page descriptors to a second node concurrently with the writing of the data to the one or more data pages of the log buffer of the first node;
   defining a last confirmed page descriptor associated with a last data page of the one or more data pages written to the log buffer of the first node;
   sending the last confirmed page descriptor associated with the last data page written to the log buffer of the first node, to the second node;
   determining that the first node has failed;
   determining, via the second node, the last confirmed page descriptor associated with the last data page written to the log buffer of the first node; and
   verifying, on the first node, one or more subsequent page descriptors based upon, at least in part, the last confirmed page descriptor associated with the last data page written to the log buffer of the first node.

2. The computer-implemented method of claim 1, further comprising:
   writing, via the second node, the one or more page descriptors to a page descriptor buffer of the second node.

3. The computer-implemented method of claim 2, further comprising:
   in response to writing the one or more page descriptors to the page descriptor buffer of the second node, sending an acknowledgement signal to the first node indicating that the one or more page descriptors are written to the page descriptor buffer of the second node.

4. The computer-implemented method of claim 3, further comprising:
   sending an acknowledgement signal to a computing device that sent the data to the storage system in response to:
      determining that the data is written to the one or more data pages of the log buffer of the first node, and
      receiving the acknowledgement signal from the second node indicating that the one or more page descriptors are written to the page descriptor buffer.

5. The computer-implemented method of claim 1, further comprising:
   defining one or more ranges of confirmed page descriptors associated with a plurality of data pages written to the log buffer of the first node; and
   sending the one or more ranges of confirmed page descriptors associated with a plurality of data pages written to the log buffer of the first node, to the second node.

6. A computer program product residing on a non-transitory computer readable medium having a plurality of instructions stored thereon which, when executed by a processor, cause the processor to perform operations comprising:
   receiving, via a first node of a plurality of nodes, data for storage in the storage system;
   writing, via the first node, the data to one or more data pages of a log buffer of the first node;
   generating, via the first node, one or more page descriptors associated with the one or more data pages;
   sending the one or more page descriptors to a second node concurrently with the writing of the data to the one or more data pages of the log buffer of the first node;
   defining one or more ranges of confirmed page descriptors associated with a plurality of data pages written to the log buffer of the first node; and
   sending, within the one or more page descriptors, the one or more ranges of confirmed page descriptors associated with a plurality of data pages written to the log buffer of the first node, to the second node.

7. The computer program product of claim 6, wherein the operations further comprise:
   writing, via the second node, the one or more page descriptors to a page descriptor buffer of the second node.

8. The computer program product of claim 7, wherein the operations further comprise:
   in response to writing the one or more page descriptors to the page descriptor buffer of the second node, sending an acknowledgement signal to the first node indicating that the one or more page descriptors are written to the page descriptor buffer of the second node.

9. The computer program product of claim 8, wherein the operations further comprise:
   sending an acknowledgement signal to a computing device that sent the data to the storage system in response to:
      determining that the data is written to the one or more data pages of the log buffer of the first node, and
      receiving the acknowledgement signal from the second node indicating that the one or more page descriptors are written to the page descriptor buffer.

10. The computer program product of claim 6, wherein the operations further comprise:
    defining a last confirmed page descriptor associated with a last data page of the one or more data pages written to the log buffer of the first node; and
    sending the last confirmed page descriptor associated with the last data page written to the log buffer of the first node, to the second node.

11. The computer program product of claim 10, wherein the operations further comprise:
    determining that the first node has failed;
    determining the last confirmed page descriptor associated with the last data page written to the log buffer of the first node; and verifying, on the first node, one or more subsequent page descriptors based upon, at least in part, the last confirmed page descriptor associated with the last data page written to the log buffer of the first node.

12. A computing system comprising:
a memory; and
a processor configured to receive, via a first node of a plurality of nodes, data for storage in the storage system, wherein the processor is further configured to write, via the first node, the data to one or more data pages of a log buffer of the first node, wherein the processor is further configured to generate, via the first node, one or more page descriptors associated with the one or more data pages, wherein the processor is further configured to send the one or more page descriptors to a second node concurrently with the writing of the data to the one or more data pages of the log buffer of the first node, wherein the processor is further configured to define one or more ranges of confirmed page descriptors associated with a plurality of data pages written to the log buffer of the first node, and wherein the processor is further configured to send, within the one or more page descriptors, the one or more ranges of confirmed page descriptors associated with a plurality of data pages written to the log buffer of the first node, to the second node.

13. The computing system of claim 12, wherein the processor is further configured to:
write, via the second node, the one or more page descriptors to a page descriptor buffer of the second node.

14. The computing system of claim 13, wherein the processor is further configured to:
in response to writing the one or more page descriptors to the page descriptor buffer of the second node, send an acknowledgement signal to the first node indicating that the one or more page descriptors are written to the page descriptor buffer of the second node.

15. The computing system of claim 14, wherein the processor is further configured to:
send an acknowledgement signal to a computing device that sent the data to the storage system in response to:
determining that the data is written to the one or more data pages of the log buffer of the first node, and
receiving the acknowledgement signal from the second node indicating that the one or more page descriptors are written to the page descriptor buffer.

16. The computing system of claim 12, wherein the processor is further configured to:
define a last confirmed page descriptor associated with a last data page of the one or more data pages written to the log buffer of the first node; and
send the last confirmed page descriptor associated with the last data page written to the log buffer of the first node, to the second node.

17. The computing system of claim 16, wherein the processor is further configured to:
determine that the first node has failed;
determine, via the second node, the last confirmed page descriptor associated with the last data page written to the log buffer of the first node; and
verify, on the first node, one or more subsequent page descriptors based upon, at least in part, the last confirmed page descriptor associated with the last data page written to the log buffer of the first node.

* * * * *